US010232698B2

United States Patent
Miyagawa et al.

(10) Patent No.: US 10,232,698 B2
(45) Date of Patent: Mar. 19, 2019

(54) MODE TRANSITION CONTROL DEVICE FOR HYBRID VEHICLE

(71) Applicant: Nissan Motor Co., Ltd., Yokohama-shi, Kanagawa (JP)

(72) Inventors: Tomohiro Miyagawa, Kanagawa (JP); Masato Koga, Kanagawa (JP); Atsushi Tsukizaki, Kanagawa (JP); Ryohey Toyota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/580,707

(22) PCT Filed: Jun. 9, 2015

(86) PCT No.: PCT/JP2015/066634
§ 371 (c)(1),
(2) Date: Dec. 8, 2017

(87) PCT Pub. No.: WO2016/199227
PCT Pub. Date: Dec. 15, 2016

(65) Prior Publication Data
US 2018/0201116 A1    Jul. 19, 2018

(51) Int. Cl.
*B60K 6/442*        (2007.10)
*B60W 10/08*       (2006.01)
(Continued)

(52) U.S. Cl.
CPC .............. *B60K 6/442* (2013.01); *B60K 6/547* (2013.01); *B60L 11/14* (2013.01); *B60W 10/02* (2013.01);
(Continued)

(58) Field of Classification Search
CPC ...... B60W 10/02; B60W 10/06; B60W 10/08; B60W 10/10; B60W 20/10; B60W 20/13;
(Continued)

(56) References Cited

U.S. PATENT DOCUMENTS 6,083,138 A    7/2000  Aoyama et al.
8,798,837 B2   8/2014  Kanayama et al.
(Continued)

FOREIGN PATENT DOCUMENTS

CN    101850768 A    10/2010
CN    102639374 A    8/2012
(Continued)

*Primary Examiner* — Khoi H Tran
*Assistant Examiner* — Robert T Nguyen
(74) *Attorney, Agent, or Firm* — Global IP Counselors, LLP

(57) ABSTRACT

A mode transition control device a hybrid vehicle has a transmission control unit that prevents a second power generation system from overheating while traveling in a series HEV mode. When a battery is at a power generation request threshold value or lower, the vehicle travels in a "series HEV mode," in which the first electric motor is utilized as a drive source and receives electrical power from the second motor/generator and the battery. The transmission control unit controls the traveling mode to transition from the "series HEV mode" to a "parallel HEV mode" when the vehicle speed has reached a switchover vehicle speed. When a temperature rise of the second power generation system is predicted while traveling in the "series HEV mode," the transmission control unit changes the switchover vehicle speed to a slower switchover vehicle speed that was used prior to a determination of the temperature rise.

10 Claims, 9 Drawing Sheets

(51) Int. Cl.
*B60W 10/10* (2012.01)
*B60W 20/13* (2016.01)
*B60W 20/20* (2016.01)
*B60W 20/30* (2016.01)
*B60K 6/547* (2007.10)
*B60L 11/14* (2006.01)
*B60W 50/00* (2006.01)
*B60W 10/02* (2006.01)
*B60W 10/06* (2006.01)
*B60W 20/10* (2016.01)
*B60W 30/00* (2006.01)

(52) U.S. Cl.
CPC ............ *B60W 10/06* (2013.01); *B60W 10/08* (2013.01); *B60W 10/10* (2013.01); *B60W 20/10* (2013.01); *B60W 20/13* (2016.01); *B60W 20/20* (2013.01); *B60W 20/30* (2013.01); *B60W 50/0097* (2013.01); *B60K 2702/04* (2013.01); *B60W 30/00* (2013.01); *B60W 2510/087* (2013.01); *B60W 2510/244* (2013.01); *B60W 2510/246* (2013.01); *B60W 2520/10* (2013.01); *B60W 2550/142* (2013.01); *B60W 2710/021* (2013.01); *B60W 2710/022* (2013.01); *B60W 2710/085* (2013.01); *B60W 2710/087* (2013.01); *B60W 2710/088* (2013.01); *B60W 2710/244* (2013.01); *B60Y 2400/421* (2013.01); *Y02T 10/6234* (2013.01); *Y02T 10/6291* (2013.01)

(58) Field of Classification Search
CPC ...... B60W 20/20; B60W 20/30; B60W 30/00; B60W 50/0097; B60W 2510/087; B60W 2510/244; B60W 2510/246; B60W 2520/10; B60W 2550/142; B60W 2710/021; B60W 2710/022; B60W 2710/085; B60W 2710/087; B60W 2710/088; B60W 2710/244; B60K 6/442; B60K 6/547; B60K 2702/04; Y02T 10/7077; B60L 11/14; B60Y 2400/421
See application file for complete search history.

(56) References Cited

U.S. PATENT DOCUMENTS

| | | | |
|---|---|---|---|
| 8,868,277 | B2 | 10/2014 | Nishimine et al. |
| 9,725,083 | B2* | 8/2017 | Dextreit .............. B60W 50/082 |
| 2013/0186233 | A1 | 7/2013 | Kaltenbach |
| 2013/0218394 | A1* | 8/2013 | Kanayama ............ B60K 6/442 701/22 |
| 2013/0253744 | A1* | 9/2013 | Nishimine ............ B60W 10/08 701/22 |
| 2015/0360552 | A1* | 12/2015 | Chung .................... B60K 6/38 477/5 |
| 2016/0347307 | A1* | 12/2016 | Banshoya ............. B60W 10/12 |

FOREIGN PATENT DOCUMENTS

| | | |
|---|---|---|
| CN | 103189261 A | 7/2013 |
| CN | 103879399 A | 6/2014 |
| CN | 103978974 A | 8/2014 |
| CN | 104024073 A | 9/2014 |
| CN | 104428183 A | 3/2015 |
| FR | 2966786 A3 | 5/2012 |
| JP | 55-157901 A | 12/1980 |
| JP | 2000-27672 A | 1/2000 |
| JP | 2002-325308 A | 11/2002 |
| JP | 2005-291012 A | 10/2005 |
| JP | 2006-94626 A | 4/2006 |
| JP | 2009-5499 A | 1/2009 |
| JP | 2010-106561 A | 5/2010 |
| JP | 2013-241129 A | 12/2013 |
| WO | 2012/059996 A1 | 5/2012 |
| WO | 2012/059998 A1 | 5/2012 |

* cited by examiner

ENGAGEMENT TABLE

| C2 | C3 | C1 Left | C1 N | C1 Right |
|---|---|---|---|---|
| N | N | EV – ICEgen | Neutral | EV – ICE 3rd |
| N | Left | EV 1st ICE 1st | EV 1st ICE – | EV 1st ICE 3rd |
| N | Right | Lock | EV 1st ICE 2nd | Lock |
| Left | N | EV 1.5 ICE 2nd | EV – ICE 2nd | Lock |
| Left | Right | Lock | EV 2nd ICE 2nd | Lock |
| N | Right | EV 2nd ICE 3rd' | EV 2nd ICE – | EV 2nd ICE 3rd |
| Right | Right | Lock | EV 2nd ICE 4th | Lock |
| Right | N | EV 2.5 ICE 4th | EV – ICE 4th | Lock |
| Right | Left | Lock | EV 1st ICE 4th | Lock |

 : NORMAL USE GEAR SHIFT STAGE

 : GEAR SHIFT STAGE USED AT LOW SOC, ETC.

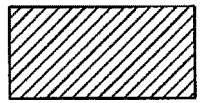 : GEAR SHIFT STAGE THAT CANNOT BE SELECTED BY SHIFT MECHANISM

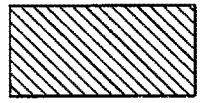 : GEAR SHIFT STAGE NOT NORMALLY USED

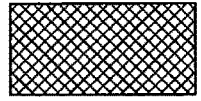 : GEAR SHIFT STAGE THAT CANNOT BE SELECTED BY INTERLOCK

FIG. 4

"EV1st ICE-" (SERIES HEV MODE)

"EV1st ICE1st" (PARALLEL HEV MODE)

MODE TRANSITION CONTROL DEVICE FOR HYBRID VEHICLE

CROSS-REFERENCE TO RELATED APPLICATIONS

This application is a U.S. National stage application of International Application No. PCT/JP2015/066634, filed Jun. 9, 2015.

BACKGROUND

Field of the Invention

The present invention relates to a mode transition control device for a hybrid vehicle that carries out a control such that the traveling mode transitions from traveling in a "series HEV mode" to traveling in a "parallel HEV mode."

Background Information

Conventionally, a series hybrid vehicle that starts an engine according to a charging state of a battery and that charges the battery with a generator is known (for example, refer to Japanese Laid-Open Patent Application No. Sho 55-157901—Patent Document 1).

SUMMARY

However, the conventional series hybrid vehicle is configured such that only the drive force of a starting motor is used when starting, and necessary electrical power to the starting motor is supplied by battery power and series generated power. Consequently, there is the problem that, if the generator is used excessively after starting in the series HEV mode while generating power, overheating occurs due to a rise in the power generation system temperature.

In view of the problems described above, an object of the present invention is to provide a mode transition control device for a hybrid vehicle, which prevents a second power generation system from overheating while traveling in a series HEV mode.

In order to achieve the object described above, the hybrid vehicle of the present invention comprises a first electric motor configured to be mechanically coupled to a drive wheel, a second electric motor that is mechanically coupled to an internal combustion engine, and a battery that is electrically coupled to the first electric motor and the second electric motor. When the charge capacity of the battery is equal to or less than a predetermined value, the vehicle travels in a series HEV mode, in which the first electric motor is utilized as a drive source and receives electrical power generated by the second electric motor and the battery. The hybrid vehicle is provided with a mode transition controller that carries out a control such that, when the vehicle speed becomes a switchover vehicle speed while traveling in the series HEV mode, power generation by the second electric motor is stopped, and a traveling mode is caused to transition to a parallel HEV mode, in which the first electric motor and the internal combustion engine are used as drive sources. When a temperature rise of a second power generation system including the second electric motor is predicted while traveling in the series HEV mode, the mode transition controller changes the switchover vehicle speed to a second switchover vehicle speed, which is slower than a first switchover vehicle speed used prior to a determination of the temperature rise.

Therefore, when a temperature rise of a second power generation system including the second electric motor is predicted while traveling in the series HEV mode, the switchover vehicle speed to the parallel HEV mode is changed to a second switchover vehicle speed, which is slower than a first switchover vehicle speed used prior to a determination of the temperature rise. That is, when a rise in the temperature of a second power generation system is predicted while traveling in the series HEV mode, a control is carried out such that power generation by the second electric motor is stopped at the timing at which the vehicle speed becomes the second switchover vehicle speed before reaching the first switchover vehicle speed, and a traveling mode is caused to transition to the parallel HEV mode. Accordingly, the timing to stop the power generation by the second electric motor will be advanced. As a result, it is possible to prevent a second power generation system from overheating while traveling in a series HEV mode.

BRIEF DESCRIPTION OF THE DRAWINGS

Referring now to the drawings, a mode transition control device control device is illustrated for a hybrid vehicle.

FIG. 4 is an engagement table illustrating the gear shift stages according to the switching positions of three engagement clutches in a multistage gear transmission mounted on a hybrid vehicle to which is applied the mode switching control device of the first embodiment.

DETAILED DESCRIPTION OF THE EMBODIMENTS

Figure 1:
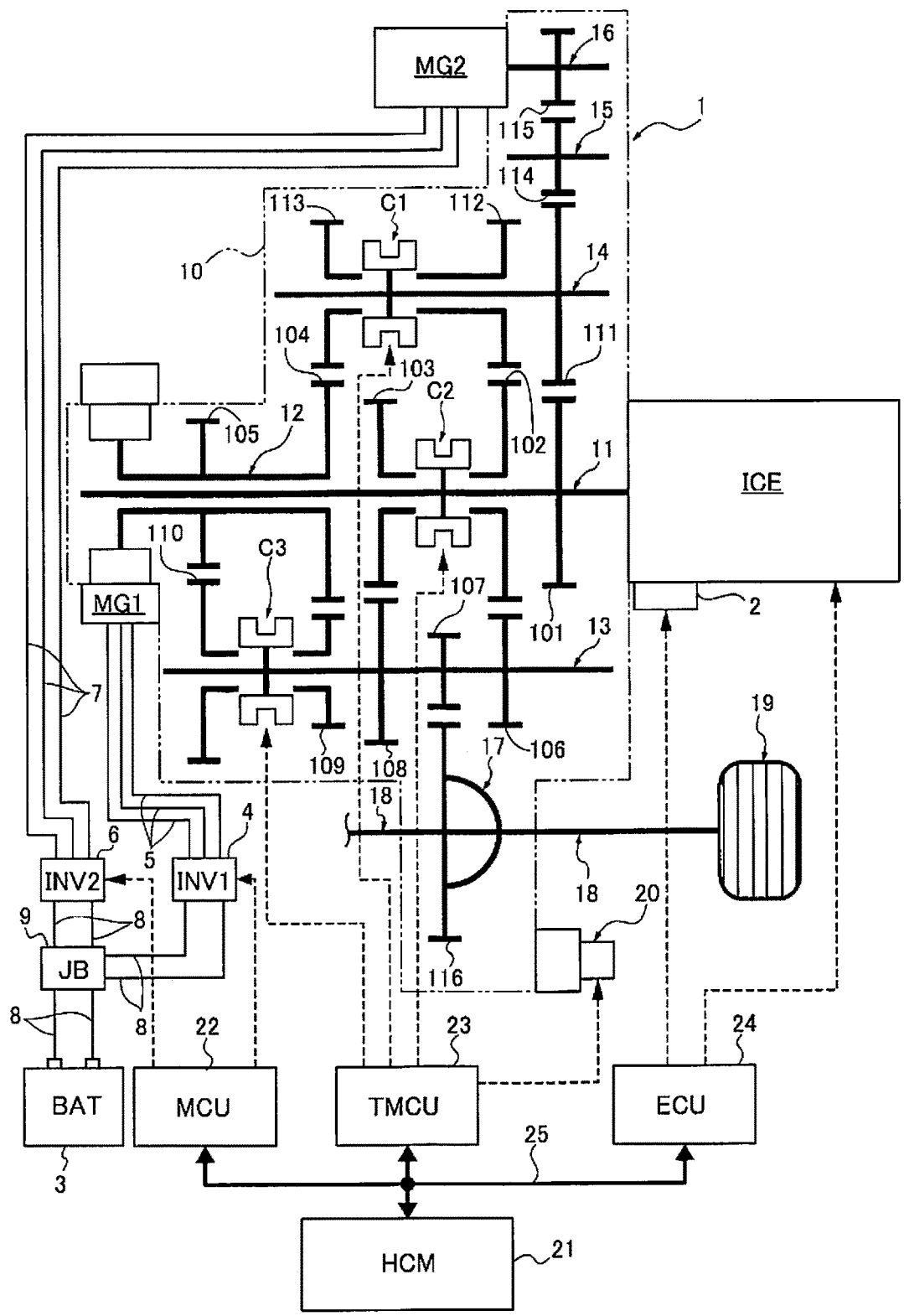
FIG. 1 is an overall system view illustrating a drive system and a control system of a hybrid vehicle to which is applied the mode transition control device in a first embodiment.

A preferred embodiment for realizing the mode transition control device for a hybrid vehicle of the present invention is explained below based on a first embodiment illustrated in the drawings.

First Embodiment

The configuration is described first. The mode transition control device of the first embodiment is applied to a hybrid vehicle (one example of a hybrid vehicle), comprising, as drive system components, one engine, two motor/generators, and a multistage gear transmission having three engagement clutches. The "overall system configuration," the "configuration of the shift control system," the "configuration of the gear shift stages," the "configuration of the mode transition control process," and the "configuration of the MG2 overheating prevention control process" will be separately described below, regarding the configuration of the mode transition control device for a hybrid vehicle in the first embodiment.

Overall System Configuration

FIG. 1 illustrates a drive system and a control system of a hybrid vehicle to which is applied the mode transition control device of the first embodiment. The overall system configuration will be described below based on FIG. 1.

The drive system of the hybrid vehicle comprises an internal combustion engine ICE, a first motor/generator MG1, a second motor/generator MG2, and a multistage gear transmission 1 having three engagement clutches C1, C2, C3, as illustrated in FIG. 1. "ICE" is an acronym for "Internal Combustion Engine."

The internal combustion engine ICE is, for example, a gasoline engine or a diesel engine that is disposed in a front compartment of a vehicle such that the crankshaft direction is in the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 is left in preparation for when an MG2 start using a high-power battery 3 cannot be ensured, such as during extreme cold.

Both the first motor/generator MG1 and the second motor/generator MG2 are permanent magnet type synchronous motors utilizing three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated to a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated to a rotor of the second motor/generator MG2 is connected to a sixth shaft 16 of the multistage gear transmission 1. A first inverter 4, which converts direct current into three-phase alternating current during powering and converts three-phase alternating current into direct current during regeneration, is connected to a stator coil of the first motor/generator MG1, via a first AC harness 5. A second inverter 6, which converts direct current into three-phase alternating current during powering and converts three-phase alternating current into direct current during regeneration, is connected to a stator coil of the second motor/generator MG2, via a second AC harness 7. The high-power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed to the first shaft 11, in order from the right side in FIG. 1. The first gear 101 is integrally provided (including integral fixing) on the first shaft 11. The second gear 102 and the third gear 103 are idling gears, in which a boss portion that protrudes in the axial direction is inserted into the outer perimeter of the first shaft 11, and are provided so as to be drivably connectable to the first shaft 11 via the second engagement clutch C2.

The second shaft 12 is connected to the first motor/generator MG1, and is a cylindrical shaft that is coaxially disposed with the axis aligned with the outer side position of the first shaft 11, and a fourth gear 104 and a fifth gear 105 are disposed on the second shaft 12, in order from the right side in FIG. 1. The fourth gear 104 and the fifth gear 105 are integrally provided (including integral fixing) on the second shaft 12.

The third shaft 13 is a shaft disposed on the output side of the multistage gear transmission 1, and a sixth gear 106, a seventh gear 107, an eighth gear 108, a ninth gear 109, and a tenth gear 110 are disposed to the third shaft 13, in order from the right side in FIG. 1. The sixth gear 106, the seventh gear 107, and the eighth gear 108 are integrally provided (including integral fixing) on the third shaft 13. The ninth gear 109 and the tenth gear 110 are idling gears, in which a boss portion that protrudes in the axial direction is inserted into the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 has both ends are supported to the transmission case 10, and an eleventh gear 111, a twelfth gear 112, and a thirteenth gear 113 are disposed to the fourth shaft 14, in order from the right side in FIG. 1. The eleventh gear 111 is integrally provided (including integral fixing) on the fourth shaft 14. The twelfth gear 112 and the thirteenth gear 113 are idling gears, in which a boss portion that protrudes in the axial direction is inserted into the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 has both ends supported to the transmission case 10, and a fourteenth gear 114 that meshes with the eleventh gear 111 of the fourth shaft 14 is integrally provided thereto (including integral fixing).

The sixth shaft 16 is a shaft to which the second motor/generator MG2 is connected, and a fifteenth gear 115 that meshes with the fourteenth gear 114 of the fifth shaft 15 is integrally provided thereto (including integral fixing).

Then, the second motor/generator MG2 and the internal combustion engine ICE are mechanically connected to each other by a gear train configured from the fifteenth gear 115, the fourteenth gear 114, the eleventh gear 111, and the first gear 101, which mesh with each other. This gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch interposed between the twelfth gear 112 and the thirteenth gear 113 of the fourth shaft 14, and is engaged by an engagement stroke in a rotation synchronization state, by not having a synchronizing mechanism. When the first engagement clutch C1 is in a left engagement position (Left), the fourth shaft 14 and the thirteenth gear 113 are drivingly connected. When the first engagement clutch C is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch interposed between the second gear 102 and the third gear 103 of the first shaft 11, and is engaged by an engagement stroke in a rotation synchronization state, by not having a synchronizing mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 is a dog clutch interposed between the ninth gear 109 and the tenth gear 110 of the third shaft 13, and that is engaged by an engagement stroke in a rotation synchronization state, by not having a synchronizing mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral fixing) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means to appropriately manage the energy consumption of the entire vehicle. This hybrid control module 21 is connected to the other control units (motor control unit 22, transmission control unit 23, engine control unit 24, etc.) so as to be capable of bidirectional information exchange by a CAN communication line 25. The "CAN" in CAN communication line 25 is an acronym for "Controller Area Network."

The motor control unit 22 (acronym: "MCU") carries out powering control, regeneration control, and the like, of the first motor/generator MG1 and the second motor/generator MG2, by control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control," a control is carried out in which a target motor rotation speed, with which the input-output rotational speeds of the clutch are synchronized, is determined, and an FB torque is output so as to converge the actual motor rotation speed to the target motor rotation speed, when there is a gear shift request to meshingly engage any one of the engagement clutches C1, C2, C3 during traveling.

The transmission control unit 23 (acronym: "TMCU") carries out a shift control for switching the gear shift stage of the multistage gear transmission 1, by outputting a current command to electric actuators 31, 32, 33 (refer to FIG. 2), based on predetermined input information. In this shift control, the engagement clutches C1, C2, C3 are selectively mesh engaged/released, and a gear pair involved in power transmission is selected from the plurality of pairs of gear pairs. Here, at the time of a gear shift request to engage any one of the released engagement clutches C1, C2, C3, in order to suppress differential rotation speed between the input-output of the clutch to ensure meshing engagement, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

Configuration of the Shift Control System

The multistage gear transmission 1 according to the embodiment 1 is characterized in that efficiency is achieved by reducing drag by employing, as shifting elements, engagement clutches C1, C2, C3 (dog clutch) that are meshingly engaged. Then, when there is a gear shift request to meshingly engage any one of the engagement clutches C1, C2, C3, the differential rotation speeds of the input-output of the clutch are synchronized by the first motor/generator MG1 (when the engagement clutch C3 is engaged) or the second motor/generator MG2 (when the engagement clutches C1, C2 are engaged), and an engagement stroke is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement stroke is started once the torque becomes equal to or less than a release torque determination value, to realize the gear shift. The configuration of the shift control system of the multistage gear transmission 1 is described below based on FIG. 2.

Figure 2:
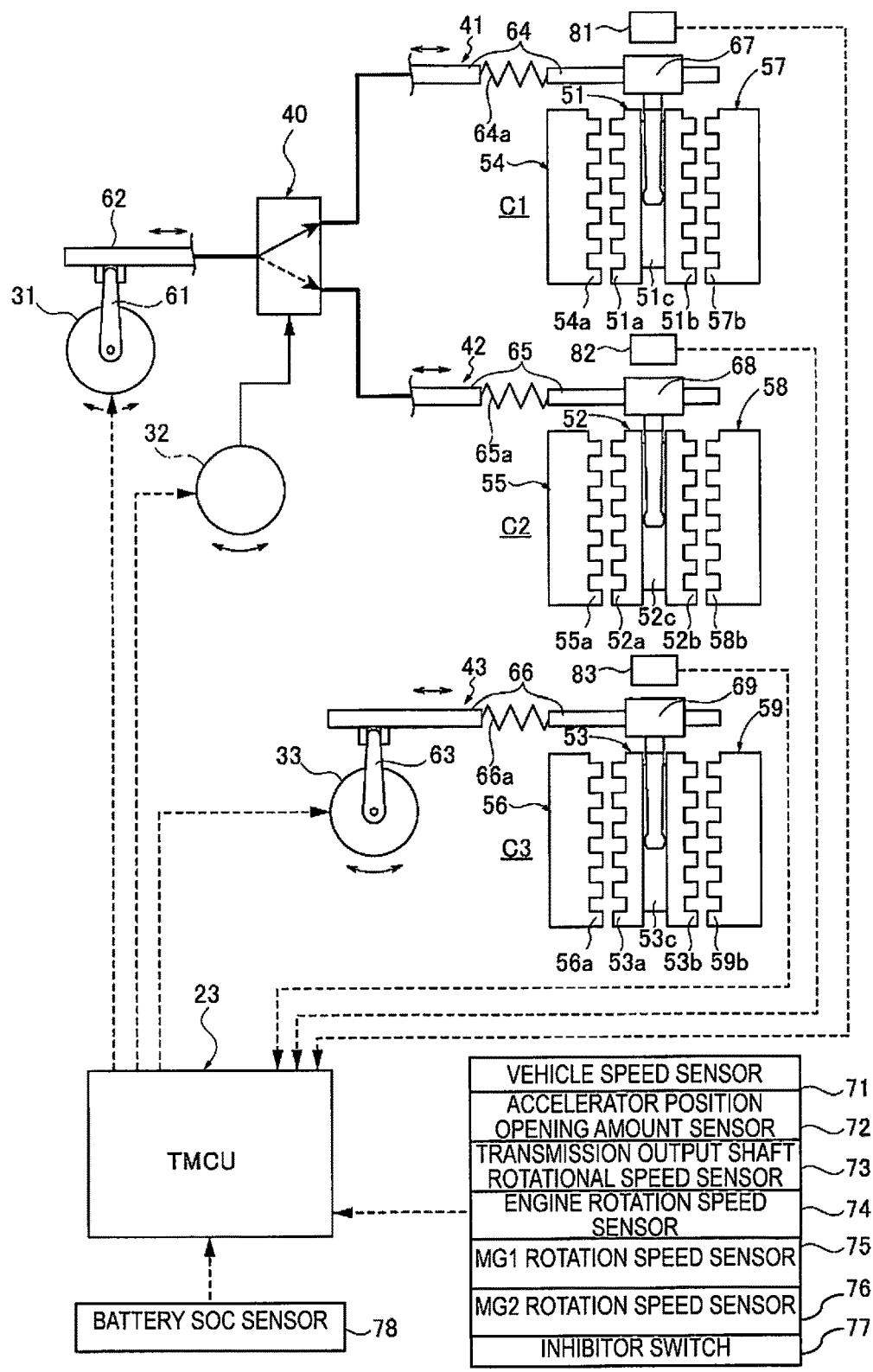
FIG. 2 is a control system block diagram illustrating the configuration of a shift control system of a multistage gear transmission mounted on a hybrid vehicle to which is applied the mode transition control device of the first embodiment.

The shift control system comprises, as engagement clutches, a first engagement clutch C1, a second engagement clutch C2, and a third engagement clutch C3, as illustrated in FIG. 2. A first electric actuator 31, a second electric actuator 32, and a third electric actuator 33 are provided. A first engagement clutch operating mechanism 41, a second engagement clutch operating mechanism 42, and a third engagement clutch operating mechanism 43 are provided as mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing engagement position), and a right engagement position (Right: right side clutch meshing engagement position). The engagement clutches C, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be strokable in the axial direction by a spline connection via a hub, which is not shown, fixed to the fourth shaft 14, the first shaft 11, and the third shaft 13, and have dog teeth 51a, 51b; 52a, 52b; 53a, 53b on both sides having flat top faces. Furthermore, fork grooves 51c, 52c, 53c are provided in the circumferential center portions of the coupling sleeves 51, 52, 53. The left dog clutch rings 54, 55, 56 are fixed to the boss portions of the gears 113, 103, 110, which are left idling gears of the engagement clutches C1, C2, C3, and have dog teeth 54a, 55a, 56a with flat top faces that oppose the dog teeth 51a, 52a, 53a. The right dog clutch rings 57, 58, 59 are fixed to the boss portions of the gears 112, 102, 109, which are right idling gears of the engagement clutches C1, C2, C3, and have dog teeth 57b, 58b, 59b with flat top faces that oppose the dog teeth 51b, 52b, 53b.

The first engagement clutch operating mechanism 41, the second engagement clutch operating mechanism 42, and the third engagement clutch operating mechanism 43 convert the turning motions of the electric actuators 31, 32, 33 into axial stroke motions of the coupling sleeves 51, 52, 53. The engagement clutch operating mechanisms 41, 42, 43 all have the same configuration, comprising turning links 61, 62, 63; shift rods 64, 65, 66; and shift forks 67, 68, 69. One end of each of the turning links 61, 62, 63 is provided on the actuator shafts of the electric actuators 31, 32, 33, with the other end connected to one of the shift rods 64, 65, 66 so as to be relatively displaceable. The shift rods 64, 65, 66 are capable of expanding and contracting according to the magnitude and the direction of the rod transmitting force, by having springs 64a, 65a, 66a interposed in the rod dividing positions. One end of each of the shift forks 67, 68, 69 is fixed to one of the shift rods 64, 65, 66, and the other end is disposed in one of the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, a battery SOC sensor 78, and the like. The transmission output shaft rotational speed sensor 73 is provided on the shaft end portion of the third shaft 13 and detects the shaft rotation speed of the third shaft 13. Then, a position servo control unit (for example, a position servo system by PID control) is provided, which controls mesh engagement and disengagement of the engagement clutches C1, C2, C3, determined by the positions of the coupling sleeves 51, 52, 53. This position servo control unit inputs sensor signals from a first sleeve position sensor 81, a second sleeve position sensor 82, and a third sleeve position sensor 83. Then, the sensor values of the sleeve position sensors 81, 82, 83 are read, and a current is imparted to the electric actuators 31, 32, 33 such that the positions of the coupling sleeves 51, 52, 53 will be in the disengaged position or the engagement position according to an engagement stroke. That is, by setting an engaged state in which the dog teeth welded to the coupling sleeves 51, 52, 53 and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, 53 and the dog teeth welded to the idling gears are in non-engagement positions by displacing the coupling sleeves 51, 52, 53 in the axial direction, the idling gears are disconnected from the fourth shaft 14, the first shaft 11, and the third shaft 13.

Configuration of the Gear Shift Stages

The multistage gear transmission 1 of the first embodiment is characterized in that size reduction is achieved by reducing the power transmission loss by not having a differential rotation absorbing element, such as a fluid coupling, and by reducing the gear shift stages of the ICE by providing motor assistance to the internal combustion engine ICE (EV gear shift stages: 1-2 speed, ICE gear shift stages: 1-4 speed). The configuration of the gear shift stages of the multistage gear transmission 1 is described below based on FIG. 3 and FIG. 4.

Figure 3:
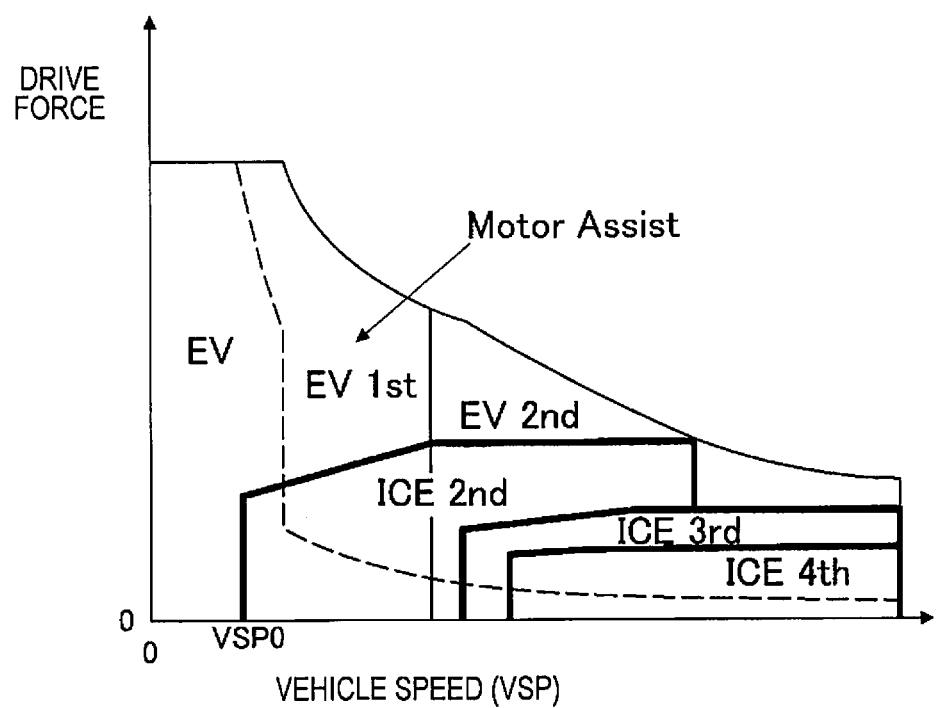
FIG. 3 is a schematic overview of a shifting map illustrating a concept of switching the gear shift stage in a multistage gear transmission mounted on a hybrid vehicle to which is applied the mode transition control device of the first embodiment.

A concept of the gear shift stages is employed in which, when the vehicle speed VSP is in a starting region that is equal to or less than a predetermined vehicle speed VSP0, since the multistage gear transmission 1 does not have a starting element (slipping element), a motor start by only the motor driving force is carried out in the "EV mode," as illustrated in FIG. 3. Then, when in the traveling region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE1st→) ICE2nd→ICE3rd→ICE4th, and the EV gear shift stages shift from EV1st→EV2nd.

All of the gear shift stages that are theoretically obtainable by the multistage gear transmission 1 having engagement clutches C1, C2, C3 are as shown in FIG. 3. In FIG. 3, "Lock" represents an interlock gear shift stage that is not applicable as a gear shift stage, "EV-" represents a state in which the first motor/generator MG1 is not drivingly connected to the driving wheels 19, and "ICE-" represents a state in which the internal combustion engine ICE is not drivingly connected to the driving wheels 19. Each of the gear shift stages is described below.

When the second engagement clutch C2 is "N" and the third engagement clutch C3 is "N," the following gear shift stages are obtained according to the position of the first engagement clutch C1. "EV-ICEgen" is obtained if the first engagement clutch C1 is "Left," "Neutral" is obtained if the first engagement clutch C1 is "N," and "EV-ICE3rd" is obtained if the first engagement clutch C1 is "Right." Here, the gear shift stage "EV-ICEgen" is a gear shift stage selected at the time of MG1 idle power generation, in which power is generated in the first motor/generator MG1 by the internal combustion engine ICE when the vehicle is stopped, or at the time of double idle power generation in which MG2 power generation is carried out in addition to MG1 power generation. The gear shift stage "Neutral" is a gear shift stage selected at the time of MG2 idle power generation, in which power is generated in the second motor/generator MG2 by the internal combustion engine ICE when the vehicle is stopped.

When the second engagement clutch C2 is "N" and the third engagement clutch C3 is "Left," the following gear shift stages are obtained according to the position of the first engagement clutch C1. "EV1st ICE1st" is obtained if the first engagement clutch C1 is "Left," "EV1st ICE-" is obtained if the first engagement clutch C1 is "N," and "EV1st ICE3rd" is obtained if the first engagement clutch C1 is "Right." Here, the gear shift stage "EV1st ICE-" is a gear shift stage selected when in the "EV mode" in which the internal combustion engine ICE is stopped and traveling is carried out by the first motor/generator MG1, or in the "series HEV mode" in which a first-speed EV traveling is carried out by the first motor/generator MG1 while power is generated in the second motor/generator MG2 by the internal combustion engine ICE.

When the second engagement clutch C2 is "Left" and the third engagement clutch C3 is "Left," "EV1st ICE2nd" is obtained if the position of the first engagement clutch C1 is "N." When the second engagement clutch C2 is "Left" and the third engagement clutch C3 is "N," the following gear shift stages are obtained according to the position of the first engagement clutch C1. "EV1.5 ICE2nd" is obtained if the first engagement clutch C1 is "Left," and "EV-ICE2nd" is obtained if the first engagement clutch C1 is "N." When the second engagement clutch C2 is "Left" and the third engagement clutch C3 is "Right," "EV2nd ICE2nd" is obtained if the position of the first engagement clutch C1 is "N."

When the second engagement clutch C2 is "N" and the third engagement clutch C3 is "Right," the following gear shift stages are obtained according to the position of the first engagement clutch C1. "EV2nd ICE3rd'" is obtained if the first engagement clutch C1 is "Left," "EV2nd ICE-" is obtained if the first engagement clutch C1 is "N," and "EV2nd ICE3rd" is obtained if the first engagement clutch C1 is "Right" Here, the gear shift stage "EV2nd ICE-" is a gear shift stage selected when in the "EV mode" in which the internal combustion engine ICE is stopped and traveling is carried out by the first motor/generator MG1, or in the "series HEV mode" in which a second-speed EV traveling is carried out by the first motor/generator MG1 while power is generated in the second motor/generator MG2 by the internal combustion engine ICE.

When the second engagement clutch C2 is "Right" and the third engagement clutch C3 is "Right," "EV2nd ICE4th" is obtained if the position of the first engagement clutch C1 is "N." When the second engagement clutch C2 is "Right" and the third engagement clutch C3 is "N," the following gear shift stages are obtained according to the position of the first engagement clutch C1. "EV2.5 ICE4th" is obtained if the first engagement clutch C1 is "Left," and "EV-ICE4th" is obtained if the first engagement clutch C1 is "N." When the second engagement clutch C2 is "Right" and the third engagement clutch C3 is "Left," "EV1st ICE4th" is obtained if the position of the first engagement clutch C1 is "N."

Described next is a method to separate the "normal use gear shift stage" from all the above-described gear shift stages achieved by engagement combinations of the engagement clutches C1, C2, C3. First, gear shift stages excluding the "interlock gear shift stages (cross hatching in FIG. 4)" and "gear shift stages that cannot be selected by the shift mechanism (right up hatching in FIG. 4)" from all the gear shift stages shall be the plurality of gear shift stages that can be achieved by the multistage gear transmission 1. Here, gear shift stages that cannot be selected by the shift mechanism refer to "EV1.5 ICE2nd" in which the first engagement clutch C1 is "Left" and the second engagement clutch C2 is "Left," and "EV2.5 ICE4th" in which the first engagement clutch C1 is "Left" and the second engagement clutch C2 is "Right" The reason these gear shift stages cannot be selected by the shift mechanism is that one first electric actuator 31 is a shift actuator that is shared for use with two engagement clutches C1, C2, and that one of the engagement clutches is neutral locked by the C1/C2 select operation mechanism 40.

Then, gear shift stages excluding the "gear shift stages not normally used (right down hatching in FIG. 3)" and "gear shift stages used with low SOC, etc. (dashed line frame in FIG. 3)" from the plurality of gear shift stages that can be achieved by the multistage gear transmission 1 shall be the "normal use gear shift stage (thick line frame in FIG. 3)." Here, the "gear shift stages not normally used" are "EV2nd ICE3rd'" and "EV1st ICE4th," and the "gear shift stages used with low SOC, etc." are "EV-ICEgen" and "EV1st ICE1st."

Therefore, "normal use gear shift stages" are configured by adding "Neutral" to EV gear shift stages (EV1st ICE-, EV2nd ICE-), ICE gear shift stages (EV-ICE2nd, EV-ICE3rd, EV-ICE4th), and combination gear shift stages (EV1st ICE2nd, EV1st ICE3rd, EV2nd ICE2nd, EV2nd ICE3rd, EV2nd ICE4th).

Configuration of the Mode Transition Control Process

Figure 5:
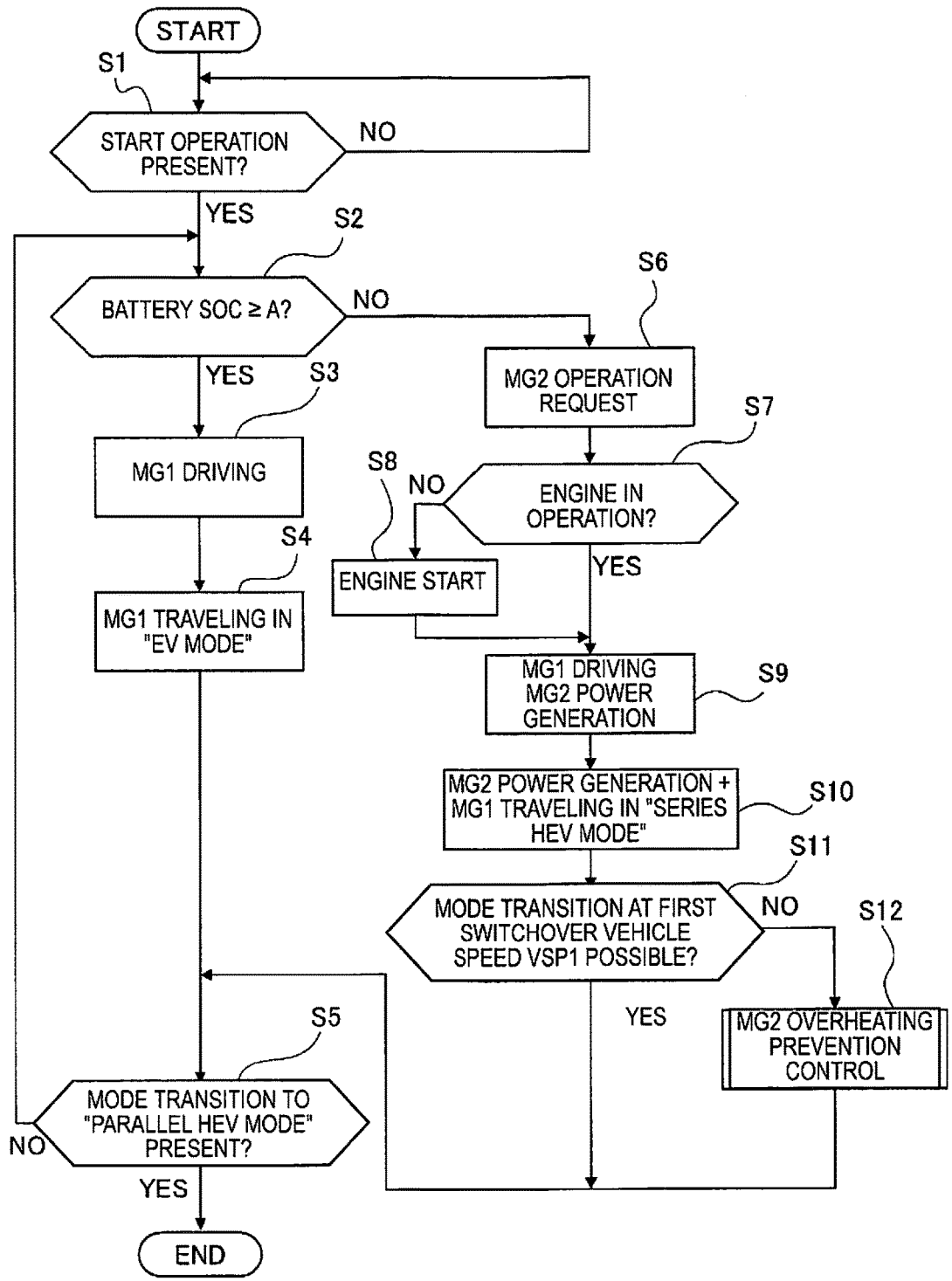
FIG. 5 is a flowchart illustrating the flow of a mode transition control process carried out in a transmission control unit of the first embodiment.

FIG. 5 illustrates the flow of the mode transition control process carried out in the transmission control unit 23 (mode transition controller) of the first embodiment. Each of the steps in FIG. 5, which shows one example of the configuration of the mode transition control process, will be described below. This mode transition control process is carried out in a low vehicle speed traveling range from an EV start to a mode transition to the "parallel HEV mode."

In Step S1, it is determined whether or not there is a start operation. In the case of YES (start operation present), the process proceeds to Step S2, and if NO (start operation absent), the determination of Step S1 is repeated. Here, a "start operation" is determined from, for example, a traveling range selection operation, a brake release operation, an accelerator pedal depression operation after a brake release, and the like.

In Step S2, following the determination that a start operation is present in Step S1, or a determination that a mode transition is absent in Step S5, it is determined whether or not the battery SOC is equal to or greater than a power generation request threshold value A. In the case of YES (battery SOC≥A, power generation request absent), the process proceeds to Step S3, and if NO (battery SOC<A, power generation request present), the process proceeds to Step S6. Here, information regarding "battery SOC" is acquired from a battery SOC sensor 78. "Power generation request threshold value A" is set as a boundary value that separates an SOC region in which a power generation request is present, and an SOC region in which a power generation request is absent (for example, A=battery SOC is about 40%).

In Step S3, following the determination that battery SOC≥A, that is, that a power generation request is absent, in Step S2, the third engagement clutch C3 of the multistage gear transmission 1 is switched from "N" to "Left" to select the "EV1st ICE-" gear shift stage. Then, the first motor/generator MG1 is driven according to an accelerator pedal depression operation, and the process proceeds to Step S4.

In Step S4, following the MG1 driving in Step S3, MG1 traveling is carried out in the "EV mode" by the "EV1st ICE-" gear shift stage, and the process proceeds to Step S5. Here, during MG1 traveling in the "EV mode," the first motor/generator MG1 carries out torque control for outputting torque corresponding to a target drive force, which is determined from the accelerator position opening amount APO and the vehicle speed VSP.

In Step S5, following the MG1 traveling in the "EV mode" in Step S4, a determination that a mode transition at the first switchover vehicle speed VSP1 is possible in Step S11, or the MG2 overheating prevention control in Step S12, it is determined whether or not there is a mode transition to the "parallel HEV mode." In the case of NO (mode transition absent), the process returns to Step S2. In the case of YES (mode transition present), the process proceeds to END, and the present control is ended. Here, the presence of a mode transition to the "parallel HEV mode" may be determined when there is a transition request to a gear shift stage of the "parallel HEV mode," when the second motor/generator MG2 is stopped based on a transition request, or when shifting is completed.

In Step S6, following the determination that battery SOC<A, that is, that a power generation request is present, in Step S2, an operation (power generation) request for the second motor/generator MG2 is output, which suppresses a reduction in the battery SOC, and the process proceeds to Step S7.

In Step S7, following the MG2 operation request in Step S6, it is determined whether or not the internal combustion engine ICE is in operation (engine in operation). In the case of YES (engine in operation), the process proceeds to Step S9, and if NO (engine stopped), the process proceeds to Step S8. Here, "engine in operation" is determined, for example, when starting from a situation in which idle power generation by an engine operation is being carried out, due to a power generation request while the vehicle is stopped.

In Step S8, following an engine stopped determination in Step S7, the internal combustion engine ICE is started (engine start) using the second motor/generator MG2 as the starter motor, and the process proceeds to Step S9.

In Step S9, following the engine in operation determination in Step S7, or the engine start in Step S8, the third engagement clutch C3 of the multistage gear transmission 1 is switched from "N" to "Left" to select the "EV1st ICE-" gear shift stage. Then, the first motor/generator MG1 is driven according to an accelerator pedal depression operation, power generation by the second motor/generator MG2 is carried out, and the process proceeds to Step S10.

In Step S10, following the MG1 driving+MG2 power generation in Step S9, MG2 power generation+MG1 traveling is carried out in the "series EV mode" by the "EV1st ICE-" gear shift stage, and the process proceeds to Step S11.

In Step S11, following the MG2 power generation+MG1 traveling in the "series HEV mode" in Step S10, it is determined whether or not a mode transition at the first switchover vehicle speed VSP1 is possible. In the case of YES (mode transition at VSP1 possible), the process proceeds to Step S5, and if NO (mode transition at VSP1 not possible), the process proceeds to Step S12. Here, the "first switchover vehicle speed VSP1" is a switchover vehicle speed at which a mode transition request is output to switch from "series EV1st (series HEV mode)" to "EV1st ICE st (parallel HEV mode)," in the shift schedule map illustrated in FIG. 7, which is selected while traveling when the battery SOC is in a low SOC region (for example, about 10 km/h). The determination of mode transition possible/mode transition not possible at the first switchover vehicle speed VSP1 is carried out as follows. First, a continuous power generation permitted time is set is advance as a time during which an increase in the MG2 temperature is suppressed, when subjecting the second motor/generator MG2 to continuous power generation. Then, when it is predicted that the vehicle speed VSP will be increased to the first switchover vehicle speed VSP1 when the elapsed time from the start of traveling in the "series HEV mode" is within the continuous power generation permitted time, due to a starting by a maximum accelerator operation, or the like, it is determined that a mode transition at the first switchover vehicle speed VSP1 is possible. On the other hand, when it is predicted that the vehicle speed VSP will not be increased to the first switchover vehicle speed VSP1, even when the elapsed time from the start of traveling in the "series HEV mode" has reached the continuous power generation permitted time, due to a starting by a minimum accelerator operation, or the like, it is determined that a mode transition at the first switchover vehicle speed VSP1 is not possible.

Figure 6:
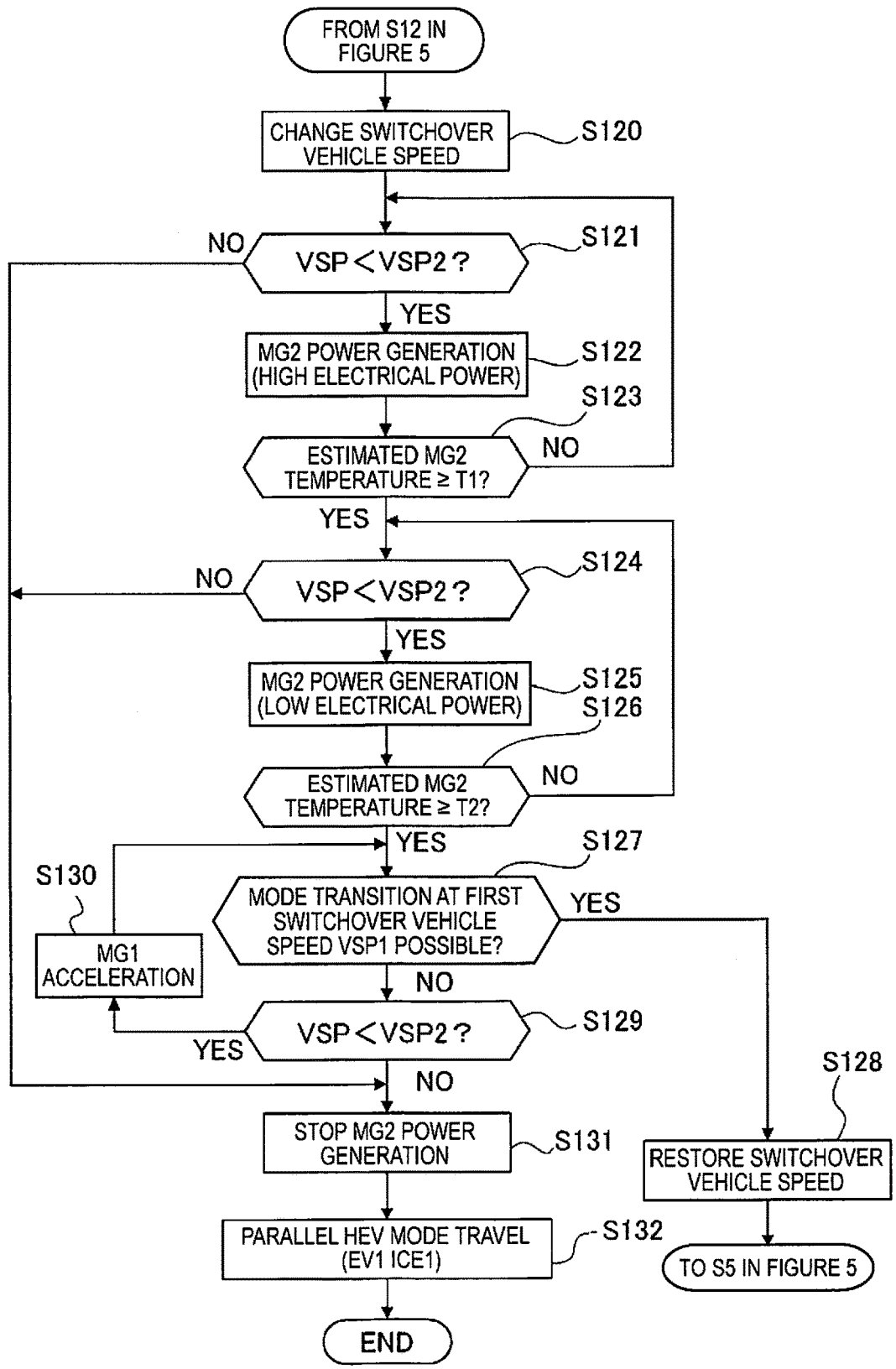
FIG. 6 is a flowchart illustrating the flow of an MG2 overheating prevention control process in the mode transition control process of FIG. 5.

In Step S12, following the determination that a mode transition at the first switchover vehicle speed VSP1 is not possible in Step S11, an MG2 overheating prevention control is carried out based on the flowchart illustrated in FIG. 6, and the process proceeds to Step S5.

Configuration of the MG2 Overheating Prevention Control Process

FIG. 6 illustrates the flow of an MG2 overheating prevention control process executed in Step S12 of the mode transition control process of FIG. 5. Each step in FIG. 6 will be described below.

Figure 7:
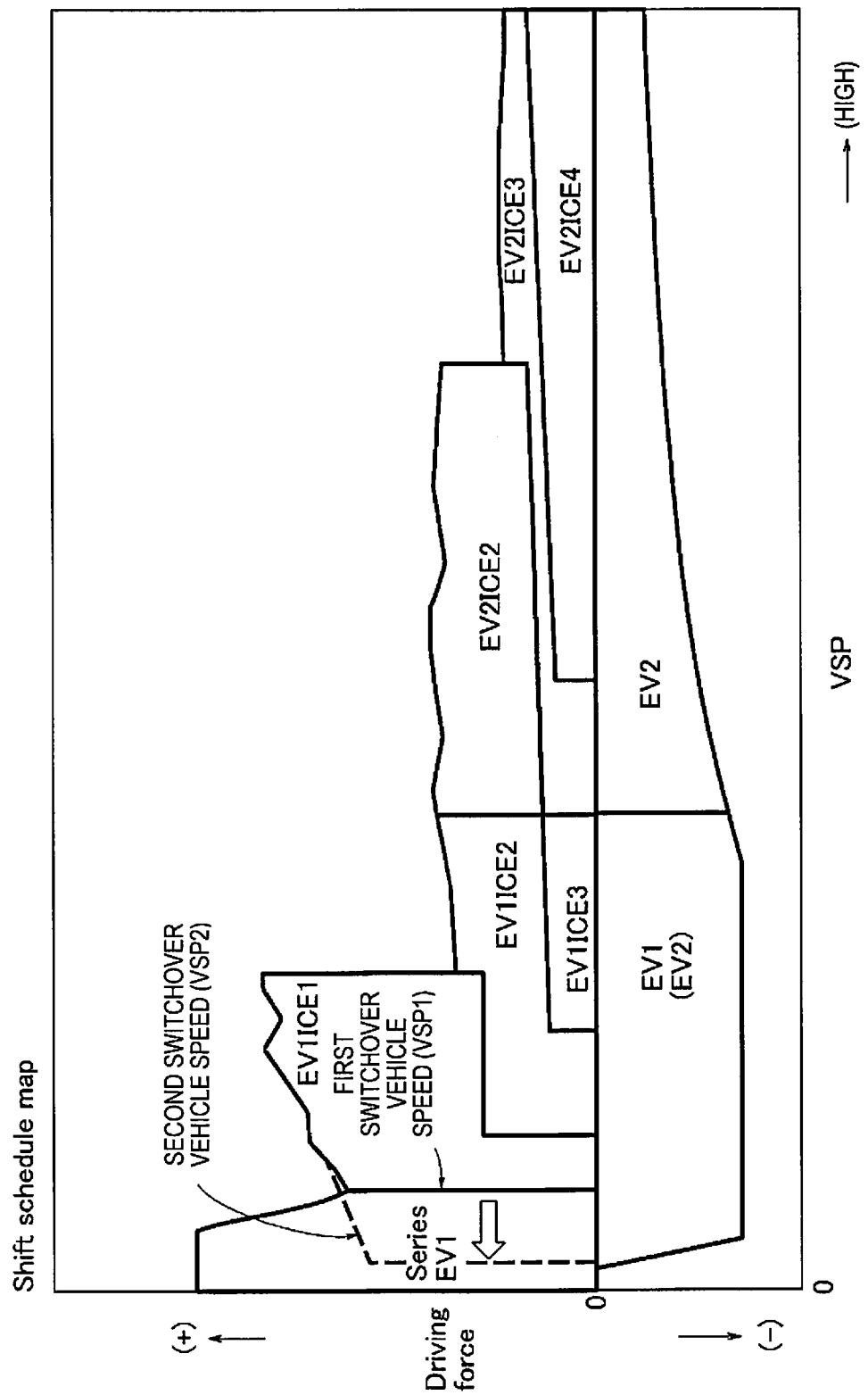
FIG. 7 is a graph illustrating a shift schedule map that is selected while traveling when the battery SOC is in a low SOC region.
Figure 8:
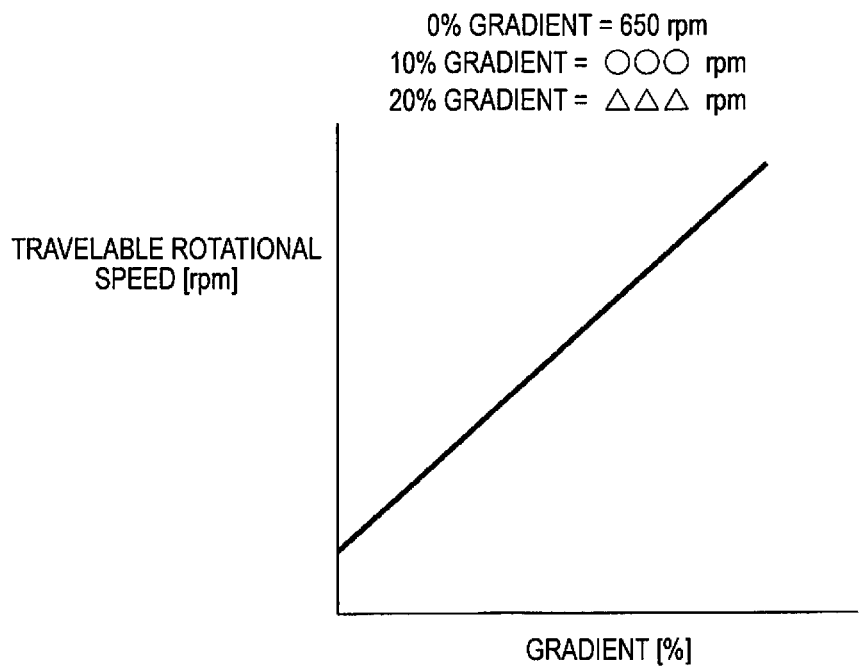
FIG. 8 is a characteristic view illustrating the relationship between the road gradient and the self-sustainable engine rotation speed.

In Step S120, following the determination that a mode transition at the first switchover vehicle speed VSP1 is not possible in Step S11 of FIG. 5, the first switchover vehicle speed VSP1 (solid line) for switching from "Series EV1st (series HEV mode)" to "EV1st ICE1st (parallel HEV mode)" in the shift schedule map (FIG. 7) is changed to a second switchover vehicle speed VSP2 (dashed line), which is slower than the first switchover vehicle speed VSP1, and the process proceeds to Step S121. Here, the "second switchover vehicle speed VSP2" is set to a vehicle speed value that decreases as the road surface gradient becomes more gradual (for example, about 5 km/h in the case of a flat road with a road surface gradient of 0%). For example, the engine rotation speed at which traveling is possible (self-sustainable operation) is set to 0% gradient=650 rpm, and then by a characteristic in which the rotational speed is increased as the gradient increases, as illustrated in FIG. 8. Therefore, the "second switchover vehicle speed VSP2" is set to a vehicle speed value that decreases as the road surface gradient becomes more gradual, according to the travelable rotational speed (engine rotation speed) due to the gradient. In addition, the "shift schedule map" is selected in the low SOC region, and is a map in which the vehicle speed VSP and the required driving force (Driving force) are the coordinate axes, and on the coordinate plane of which is assigned a selection region for selecting a gear shift stage obtained by adding "EV1st ICE1st" to the normal use gear shift stage, as illustrated in FIG. 7. That is, a selection region of "Series EV1st" is assigned to the low vehicle speed region after a start, as a drive driving region by an accelerator pedal depression. Then, the selection regions of "EV1st ICE1st," "EV1st ICE2nd," and "EV1st ICE3rd" are assigned to the intermediate vehicle speed region, and the selection regions of "EV2nd ICE2nd," "EV2nd ICE3rd," and "EV2nd ICE4th" are assigned to the high vehicle speed region. As coasting regenerative braking regions with the foot away from the accelerator, the selection region of "EV1st (EV2nd)" is assigned to the low to intermediate vehicle speed region, and the selection region of "EV2nd" is assigned to the high vehicle speed region.

In Step S121, following the change in the switchover vehicle speed in Step S120, or the determination that estimated MG2 temperature <T1 in Step S123, it is determined whether or not the vehicle speed VSP at that time is less than the second switchover vehicle speed VSP2. In the case of YES (VSP<VSP2), the process proceeds to Step S122, and if NO (VSP≥VSP2), the process proceeds to Step S131. Here, information on "vehicle speed VSP" is acquired from a vehicle speed sensor 71.

In Step S122, following the determination that VSP<VSP2 in Step S121, power is generated by the second motor/generator MG2 by traveling in the "series HEV mode," and the process proceeds to Step S123.

Here, when generating power by the second motor/generator MG2 in Step S122, the generated electrical power is set to be high electrical power, which is the normal MG2 generated electrical power (for example, 15 kW). The generated electrical power by the second motor/generator MG2 can be switched between high electrical power (for example, 15 kW) and low electrical power (for example, 5 kW).

In Step S123, following the MG2 power generation (high electrical power) in Step S122, it is determined whether or not an estimated MG2 temperature is equal to or greater than a first temperature threshold value T1. In the case of YES (estimated MG2 temperature ≥T1), the process proceeds to Step S124, and if NO (estimated MG2 temperature <T1), the process returns to Step S121. Here, the "estimated MG2 temperature" is an estimated temperature of the second motor/generator MG2 that is used for power generation, and is estimated by an arithmetic expression using the MG2 generated electrical power and the MG2 power generation duration time. "First temperature threshold value T1" is set to a temperature threshold value at which there is the risk that the second motor/generator MG2 will be overheated (overheat), if MG2 power generation by high electrical power is continued as is (for example, T1=150'C).

In Step S124, following the determination that estimated MG2 temperature ≥T1 in Step S123, or the determination that estimated MG2 temperature <T2 in Step S126, it is determined whether or not the vehicle speed VSP at that time is less than the second switchover vehicle speed VSP2, in the same manner as Step S121. In the case of YES (VSP<VSP2), the process proceeds to Step S125, and if NO (VSP≥VSP2), the process proceeds to Step S131.

In Step S125, following the determination that VSP<VSP2 in Step S124, low electrical power generation is carried out by the second motor/generator MG2 by traveling in the "series HEV mode," and the process proceeds to Step S126. In this Step S125, the generated electrical power by the second motor/generator MG2 is reduced from high electrical power (for example, 15 kW) to low electrical power (for example, 5 kW).

In Step S126, following the MG2 power generation (low electrical power) in Step S125, it is determined whether or not the estimated MG2 temperature is equal to or greater than a second temperature threshold value T2. In the case of YES (estimated MG2 temperature ≥T2), the process proceeds to Step S127, and if NO (estimated MG2 temperature <T2), the process returns to Step S124. Here, "second temperature threshold value T2" is set to a temperature threshold value at which there is the risk that the second motor/generator MG2 will be overheated (overheat), if MG2 power generation by low electrical power is continued as is (for example, T2=180'C).

In Step S127, following the determination that estimated MG2 temperature ≥T2 in Step S126, or MG1 acceleration in Step S130, it is determined whether or not a mode transition at the first switchover vehicle speed VSP1 is possible, in the same manner as Step S11 of FIG. 5. In the case of YES (mode transition at VSP1 possible), the process proceeds to Step S128, and if NO (mode transition at VSP1 not possible), the process proceeds to Step S129.

In Step S128, following the determination that a mode transition at VSP1 is possible in Step S127, the second switchover vehicle speed VSP2 that was changed in Step S120 is restored to the first switchover vehicle speed VSP1 before the change, and the process proceeds to Step S5 of FIG. 5.

In Step S129, following the determination that a mode transition at VSP1 is not possible in Step S127, it is determined whether or not the vehicle speed VSP at that time is less than the second switchover vehicle speed VSP2, in the same manner as Step S121 and Step S124. In the case of YES (VSP<VSP2), the process proceeds to Step S130, and if NO (VSP≥VSP2), the process proceeds to Step S131.

Figure 9:
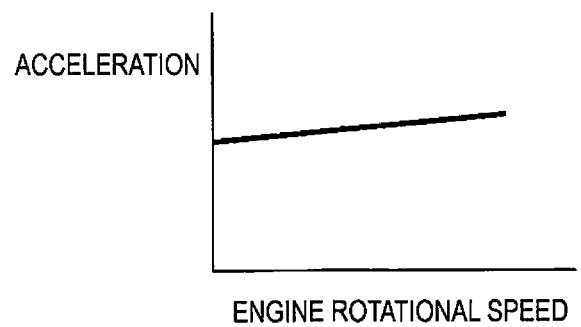
FIG. 9 is a characteristic view illustrating the relationship between engine rotation speed and acceleration.

In Step S130, following the determination that VSP<VSP2 in Step S129, the acceleration is determined based on the engine rotation speed Ne at that time, such that the vehicle speed will be at least equal to or greater than the second switchover vehicle speed VSP2 based on the characteristics illustrated in FIG. 9, and the vehicle is accelerated by increasing the required driving force for the first motor/generator MG1, after which the process returns to Step S127. Here, information regarding "engine rotation speed Ne" is acquired from an engine rotation speed sensor 74.

In Step S131, following the determination that VSP≥VSP2 in Step S121, Step S124, or Step S129, power generation by the second motor/generator MG2 is stopped based on a mode transition request due to the establishment of VSP≥VSP2 (FIG. 7), and the process proceeds to Step S132.

In Step S132, following the MG2 power generation stop in Step S131, the traveling mode is caused to transition from the "series HEV mode" to the "parallel HEV mode" by shifting from the "Series EV1st" gear shift stage to the "EV1st ICE1st" gear shift stage, and the process proceeds to END.

Next, the actions are described. The "action of the mode transition control process," the "action of the MG2 overheating prevention control process," the "action of the mode transition control," and the "characteristic action of the mode transition control" will be described separately, regarding the actions of the mode transition control device for a hybrid vehicle according to the first embodiment.

Action of the Mode Transition Control Process
(FIG. 5)

When a start operation is present and the battery SOC≥A, a power generation request is thus absent, and the process proceeds from Step S1→Step S2→Step S3→Step S4→Step S5 in the flowchart of FIG. 5. Then, while it is being determined that a mode transition to the "parallel HEV mode" is absent in Step S5, the flow proceeding from Step S2→Step S3→Step S4→Step S5 is repeated. Therefore, in Step S3, the third engagement clutch C3 is switched from "N" to "Left," and the driving of the first motor/generator MG1 is started according to an accelerator pedal depression operation. In Step S4, MG1 traveling is carried out in the "EV mode" by the "EV1st ICE-" gear shift stage.

When a start operation is present and the battery SOC<A, a power generation request is thus present, and the process proceeds from Step S1→Step S2→Step S6→Step S7 in the flowchart of FIG. 5. Then, in Step S7, following the MG2 operation request in Step S6, it is determined whether or not the engine is in operation, and the process directly proceeds to Step S9 if the engine is in operation. If the engine is stopped, the process proceeds from Step S7 to Step S8, and the engine is started using the second motor/generator MG2 as the starter motor in Step S8, after which the process proceeds to Step S9. The process proceeds from Step S9 to Step S10→Step S11. In Step S11, it is predicted and determined whether or not a mode transition to the "parallel HEV mode" is possible at the first switchover vehicle speed VSP1. Then, while it is being determined that a mode transition at the first switchover vehicle speed VSP1 is possible in Step S11 due to an acceleration starting scenario, or the like, and that a mode transition to the "parallel HEV mode" is absent in Step S5, the flow proceeding from Step S2→Step S6→Step S7→Step S9→Step S10→Step S1→Step S5 is repeated. Therefore, in Step S9, the third engagement clutch C3 is switched from "N" to "Left," and the first motor/generator MG1 is driven according to an accelerator pedal depression operation. In Step S10, MG2 power generation+MG1 traveling is carried out in the "series HEV mode" by the "EV1st ICE-" gear shift stage.

On the other hand, in a traveling scenario in which a low vehicle speed is maintained after starting, or the like, it is determined that a mode transition to the "parallel HEV mode" is not possible at the first switchover vehicle speed VSP1 in Step S11. At this time, the flow that proceeds from Step S2→Step S6→Step S7→Step S9→Step S10→Step S11→Step S12→Step S5 is repeated. Therefore, in Step S12, an MG2 overheating prevention control is carried out based on the flowchart illustrated in FIG. 6.

Action of the MG2 Overheating Prevention Control Process (FIG. 6)

When it is predicted and determined that a mode transition at the first switchover vehicle speed VSP1 is not possible in Step S11 of FIG. 5, the process proceeds to Step S120 in the flowchart of FIG. 6. In Step S120, the first switchover vehicle speed VSP1 for switching from "Series EV1st (series HEV mode)" to "EV1st ICE1st (parallel HEV mode)" in the shift schedule map (FIG. 7) is changed to a second switchover vehicle speed VSP2, which is slower than the first switchover vehicle speed VSP1.

When it is determined that the vehicle speed VSP is less than the second switchover vehicle speed VSP2 in Step S121, the process proceeds from Step S121→Step S122→Step S123 in the flowchart of FIG. 6. Then, while it is being determined that estimated MG2 temperature <T1 in Step S123, the flow that proceeds from Step S121→Step S122→Step S123 in the flowchart of FIG. 6 is repeated. Therefore, until the estimated MG2 temperature reaches the first temperature threshold value T1, power generation (high electrical power) by the second motor/generator MG2 by traveling in the "series HEV mode" is maintained in Step S122.

Thereafter, when it is determined that estimated MG2 temperature ≥T1 in Step S123 due to MG2 power generation (high electrical power), the process proceeds from Step S123 to Step S124. When it is determined that the vehicle speed VSP is less than the second switchover vehicle speed VSP2 in Step S124, the process proceeds from Step S124 to Step S125→Step S126. While it is being determined whether estimated MG2 temperature <T2 in Step S126, the flow that proceeds from Step S124→Step S125→Step S126 in the flowchart of FIG. 6 is repeated. Therefore, until the estimated MG2 temperature reaches the second temperature threshold value T2 from the first temperature threshold value T1, the generated electrical power is switched to low electrical power, and power generation (low electrical power) by the second motor/generator MG2 is carried out by traveling in the "series HEV mode."

Then, when it is determined that estimated MG2 temperature ≥T2 in Step S126, the process proceeds from Step S126 to Step S127→Step S129. When it is determined that a mode transition at the first switchover vehicle speed VSP1 is not possible in Step S127, and it is determined that the vehicle speed VSP is less than the second switchover vehicle speed VSP2 in Step S129, the process proceeds to Step S130; in Step S130, the vehicle is accelerated by increasing the required driving force for the first motor/generator MG1.

When it is determined that a mode transition at the first switchover vehicle speed VSP1 is possible in Step S127 due to the MG1 acceleration in Step S130, the process proceeds to Step S128; in Step S128, the switchover vehicle speed that was changed in Step S120 is restored to the first switchover vehicle speed VSP1 before the change, and the process proceeds to Step S5 of FIG. 5.

On the other hand, when it is determined that a mode transition at the first switchover vehicle speed VSP1 is not possible in Step S127 but that the vehicle speed VSP has become equal to or greater than the second switchover vehicle speed VSP2 in Step S129, due to the MG1 acceleration in Step S130, the process proceeds from Step S129 to Step S131→Step S132→END. In Step S131, power generation by the second motor/generator MG2 is stopped, and in the subsequent Step S132, the "EV1st ICE1st" gear shift stage is selected, and traveling is carried out with a mode transition to the "parallel HEV mode."

If it is determined that the vehicle speed VSP has become equal to or greater than the second switchover vehicle speed VSP2 in Step S121 or Step S124, which are intermediate stages of MG2 power generation, the process proceeds from Step S121 or Step S124 to Step S131→Step S132→END. In Step S131, power generation by the second motor/generator MG2 is stopped, and in the subsequent Step S132, the "EV1st ICE1st" gear shift stage is selected, and traveling is carried out with a mode transition to the "parallel HEV mode."

Action of the Mode Transition Control

The vehicle subject to the present control is a hybrid vehicle that is capable of traveling while selecting the "series HEV mode," that is, traveling by the first motor/generator MG1 while generating power by the second motor/generator MG2. The hybrid vehicle may be brought to an overheated state by the temperature of the second motor/generator MG2 rising excessively, in a case in which the second motor/generator MG2 for generating power is used excessively.

Figure 10:
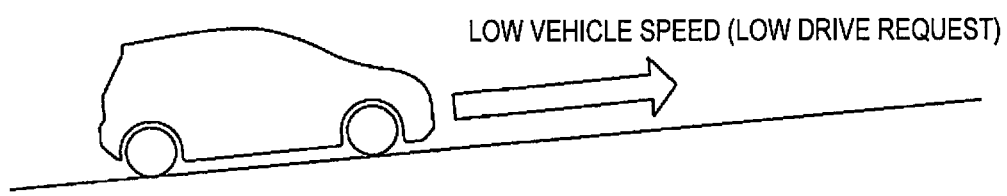
FIG. 10 is an explanatory view illustrating a traveling example in the "series HEV mode" at a low vehicle speed on a gradual uphill slope (drive request is low).

If MG2 power generation can therefore no longer be continued, the battery SOC of the high-power battery 3 will be reduced, and it becomes impossible to carry out an EV start with the first motor/generator MG1, an engine start with the second motor/generator MG2, and a rotation synchronization control at the time of shifting, and the like. Since it is necessary to reliably avoid such situations, the required driving force is predicted, and a control is carried out to optimize the allocation thereof to the internal combustion engine ICE, the first motor/generator MG1, and the second motor/generator MG2, based on the MG2 temperature state. The intention is to thus to prevent an overheating (overheat) of the second motor/generator MG2. The action of the mode transition control will be described below, based on FIG. 1 and FIG. 12, using as an example a traveling scenario in which is maintained a low vehicle speed on a gradual uphill road as illustrated in FIG. 10 (drive request is low).

First, at the time of starting, if battery SOC≥A and a power generation request is absent, the third engagement clutch C3 of the multistage gear transmission 1 is switched from "N" to "Left," and MG1 traveling is carried out in the "EV mode" by the "EV1st ICE-" gear shift stage. In this MG1 traveling in the "EV mode," an MG1 torque flow, which flows from the first motor/generator MG1 to the drive wheels 19 via the third engagement clutch C3, is formed (only the left side arrow in FIG. 11).

For example, if MG1 traveling in the "EV mode" is continued, the battery SOC of the high-power battery 3 is reduced by the consumption of the battery SOC by the first motor/generator MG1, and the state transitions to battery SOC<A (power generation request present). When the state transitions to battery SOC<A, the second motor/generator MG2 is driven by the internal combustion engine ICE to generate power based on an MG2 operation request, and MG2 power generation+MG1 traveling is carried out in the "series HEV mode," in which traveling is carried out in the EV first gear stage, using the first motor/generator MG1 as the drive source.

Figure 11:
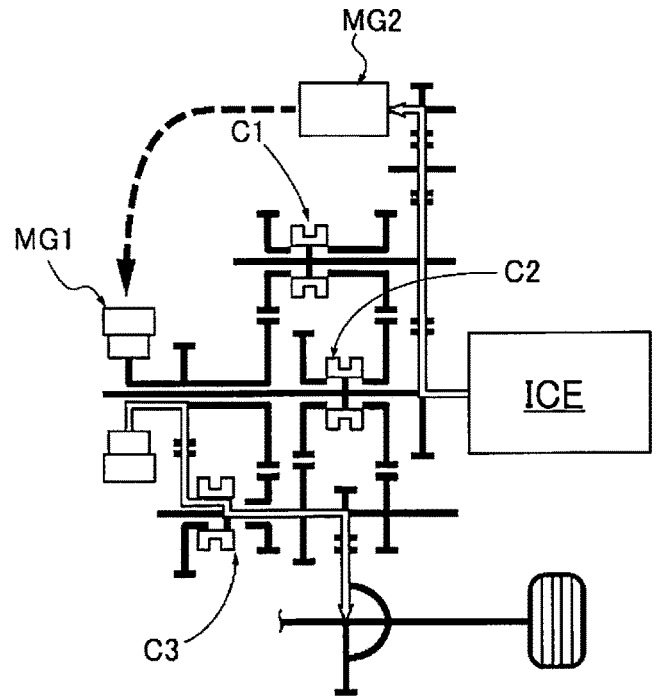
FIG. 11 is a torque flow view illustrating the flow of the MG1 torque and the engine torque in a multistage gear transmission when the "series HEV mode" according to an "EV1st ICE-" gear shift stage is selected.

In this MG2 power generation+MG1 traveling in the "series HEV mode," an MG1 torque flow that flows from the first motor/generator MG1 to the drive wheels 19 via the third engagement clutch C3, and an ICE torque flow that flows from the internal combustion engine ICE to the second motor/generator MG2 are formed, as illustrated in FIG. 11. Therefore, as illustrated by the broken line arrow in FIG. 11, the MG2 generated electrical power portion can be supplied to the first motor/generator MG1, and the reduction in the battery SOC of the high-power battery 3 is suppressed, compared with the "EV mode." For example, when MG2 power generation+MG1 traveling in the "series HEV mode" is continued in a traveling scenario in which a low vehicle speed is maintained, a mode transition at the first switchover vehicle speed VSP1 within the continuous power generation permitted time of the second motor/generator MG2 becomes impossible.

In this manner, when it predicted that a mode transition at the first switchover vehicle speed VSP1 is not possible, an MG2 overheating prevention control is initiated. In the MG2 overheating prevention control, first, the switchover vehicle speed for switching from the "series HEV mode" to the "parallel HEV mode" in the shift schedule map (FIG. 7) is changed from the first switchover vehicle speed VSP1 to the second switchover vehicle speed VSP2 (<VSP1). With the changing of this switchover vehicle speed, the timing to transition the mode to the "parallel HEV mode," in which power generation by the second motor/generator MG2 is stopped, can be advanced.

Then, in the MG2 overheating prevention control, the vehicle speed VSP and the estimated MG2 temperature are monitored, and if the vehicle speed VSP is less than the second switchover vehicle speed VSP2 due to traveling in a low vehicle speed region, MG2 power generation by the "series HEV mode" is carried out in a stepwise manner. That is, while it is being determined that estimated MG2 temperature <T1, MG2 generated electrical power is set to be power generation by means of high electrical power. Then, when it is determined that estimated MG2 temperature ≥T1 due to MG2 power generation (high electrical power), MG2 generated electrical power is set to be power generation by means of low electrical power, while it is being determined whether estimated MG2 temperature <T2. As a result, during the "series HEV mode" in which the engine rotational speed Ne is less than the second switchover vehicle speed VSP2, MG2 power generation is carried out, which secures the maximum power generation amount while preventing the second motor/generator MG2 from overheating.

On the other hand, when the engine rotation speed Ne becomes equal to or greater than the second switchover vehicle speed VSP2 during an MG2 overheating prevention control, the "EV1st ICE1st" gear shift stage is selected, and the traveling mode is caused to transition from the "series HEV mode" to the "parallel HEV mode." That is, if the engine rotation speed Ne becomes equal to or greater than the second switchover vehicle speed VSP2 due to a rise in the vehicle speed VSP, the power generation by the second motor/generator MG2 is stopped, the "EV1st ICE1st" gear shift stage is selected, and traveling is carried out with a mode transition to the "parallel HEV mode." Here, cases in which the vehicle speed VSP is raised such that VSP≥VSP2 include, not only cases due to an acceleration operation of the driver, transition to a downhill slope road, and the like (S121, S124), but also forced increases by a system operation due to an MG1 acceleration (S130), when estimated MG2 temperature ≥T2 is established.

Figure 12:
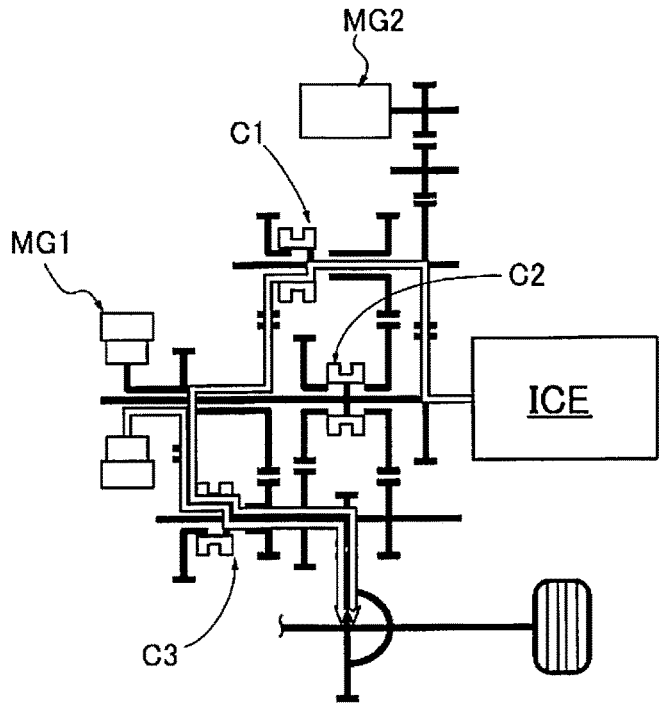
FIG. 12 is a torque flow diagram illustrating the flow of the MG1 torque and the engine torque in a multistage gear transmission when the "parallel HEV mode" according to an "EV1st ICE1st" gear shift stage is selected.

When traveling in the "parallel HEV mode" by the "EV1st ICE1st" gear shift stage, the second motor/generator MG2 is in a stopped state, as illustrated in FIG. 12. Then, an MG1 torque flow that flows from the first motor/generator MG1 to the drive wheels 19 via the third engagement clutch C3, and an ICE torque flow that flows from the internal combustion engine ICE to the drive wheels 19 via the first clutch C and the third clutch C3 are formed. Therefore, there is no temperature rise due to power generation of the second motor/generator MG2, and hybrid traveling is carried out in which the vehicle travels by the combined drive force of the first motor/generator MG1 and the internal combustion engine ICE.

In this manner, in the MG2 overheating prevention control, the switchover vehicle speed at which the traveling mode is caused to transition to the "parallel HEV mode" is changed from the first switchover vehicle speed VSP1 to the second switchover vehicle speed VSP2 (<VSP1). Then, until the vehicle speed VSP reaches the second switchover vehicle speed VSP2, effective MG2 power generation is carried out while suppressing a rise in the MG2 temperature. Furthermore, when the vehicle speed VSP reaches the second switchover vehicle speed VSP2, a control is carried out such that power generation by the second motor/generator MG2 is stopped, and the traveling mode is caused to transition to from the "series HEV mode" to the "parallel HEV mode."

Characteristic Action of the Mode Transition Control

The first embodiment is configured such that, when a rise in the temperature of the second power generation system, including the second motor-generator MG2, is predicted while traveling in the "series HEV mode," the switchover vehicle speed is changed to a second switchover vehicle speed VSP2, which is slower than a first switchover vehicle speed VSP1 used prior to a determination of the temperature rise. That is, when a rise in the temperature of the second power generation system is predicted while traveling in the "series HEV mode," a control is carried out such that power generation by the second motor/generator MG2 is stopped at the timing at which the vehicle speed VSP becomes the second switchover vehicle speed VSP2 before reaching the first switchover vehicle speed VSP1, and the traveling mode is caused to transition to the "parallel HEV mode." Accordingly, the timing to stop the power generation by the second motor/generator MG2 will be advanced. As a result, it is possible to prevent the second power generation system, including the second motor/generator MG2, from overheating (overheat) while traveling in the "series HEV mode."

The first embodiment is configured to set the switchover vehicle speed to a vehicle speed value that decreases as the road surface gradient becomes more gradual, when changing the switchover vehicle speed from the first switchover vehicle speed VSP1 to the second switchover vehicle speed VSP2. That is, the engine rotation speed at which self-sustainable operation is possible decreases as the road surface gradient becomes more gradual, and the engine rotation speed at which self-sustainable operation is possible increases as the road surface gradient increases. The value of the switchover vehicle speed is set in accordance with this characteristic. Therefore, the traveling region of the "parallel HEV mode" expands as the road surface gradient becomes more gradual, and the traveling region in which it is possible to prevent the second power generation system, including the second motor/generator MG2, from overheating (overheat) expands.

The first embodiment is provided with a shift schedule map (FIG. 7) in which "required driving force (Driving Force)" and "Vehicle speed (VSP)" are the coordinate axes. Then, when a temperature rise in the second motor/generator MG2 is determined while traveling in the "series HEV mode," the required driving force is increased (MG1 acceleration). That is, when low vehicle speed travel is continued for a long period of time, and a mode transition to the "parallel HEV mode" is delayed, there is a high probability of the second power generation system overheating (overheat). On the other hand, by carrying out MG1 acceleration by increasing the required driving force by a system operation, instead of a driver operation or a change in the traveling environment, a mode transition to the "parallel HEV mode" is promoted. Therefore, by promoting a mode transition to the "parallel HEV mode" by a system operation when low vehicle speed travel is continued for a long period of time, it is possible to reliably prevent the second power generation system from overheating (overheat).

When carrying out an MG1 acceleration by increasing the required driving force, the first embodiment is configured to reduce the amount of increase as the road surface gradient becomes more gradual. That is, when MG1 acceleration is carried out by increasing the required driving force by a system operation, instead of a driver operation or a change in the traveling environment, since the acceleration behavior of the vehicle is not intended by the driver, discomfort will be imparted to the driver. In contrast, when increasing the required driving force, discomfort that is imparted to the driver is reduced by reducing the amount of increase, that is, the MG1 acceleration amount, as the road surface gradient becomes more gradual.

In the first embodiment, while the estimated MG2 temperature is less than a first temperature threshold value T1, series power generation by the second motor/generator MG2 is carried out at the normal output. While the estimated MG2 temperature is equal to or greater than the first temperature threshold value T1 and less than a second temperature threshold value T2, series power generation by the second motor/generator MG2) is carried out at an output that is lower than the normal output. Then, when the estimated MG2 temperature becomes equal to or greater than the second temperature threshold value T2, series power generation by the second motor/generator MG2 is stopped. That is, by setting temperature threshold values in a stepwise manner, a temperature rise of the second motor/generator MG2 is suppressed, and traveling in the "series HEV mode" becomes possible over many time periods. Therefore, when traveling at a low vehicle speed is continued, it is possible to prevent the second power generation system from overheating, and to contribute to an improvement in fuel consumption performance by securing the MG2 power generation amount.

Next, the effects are described. The effects listed below can be obtained by the mode transition control device for a hybrid vehicle according to the first embodiment.

(1) A hybrid vehicle having a first electric motor (first motor/generator MG1) configured to be mechanically coupled to a drive wheel 19, a second electric motor (second motor/generator MG2) that is mechanically coupled to an internal combustion engine ICE, and a battery (high-power battery 3) that is electrically coupled to the first electric motor and the second electric motor, and when a charge capacity (battery SOC) of the battery (high-power battery 3) is equal to or less than a predetermined value (power generation request threshold value A), the hybrid vehicle travels in a "series HEV mode," in which the first electric motor (first motor/generator MG1), to which electrical power generated by the second electric motor (second motor/generator MG2) and the battery power are supplied, is utilized as a drive source, a mode transition controller (transmission control unit 23) is provided, which carries out a control such that, when a vehicle speed VSP becomes a switchover vehicle speed while traveling in the "series HEV mode," power generation by the second electric motor (second motor/generator MG2) is stopped, and the traveling mode is caused to transition to a "parallel HEV mode," in which the first electric motor (first motor/generator MG1) and the internal combustion engine ICE are used as drive sources, and when a rise in the temperature of a second power generation system, including the second electric motor (second motor/generator MG2), is predicted while traveling in the "series HEV mode," the mode transition controller (transmission control unit 23) changes a switchover vehicle speed to a second switchover vehicle speed VSP2 which is slower than a first switchover vehicle speed VSP1 used prior to a determination of the temperature rise (FIG. 6, S120). Accordingly, it is possible to prevent the second power generation system, including the second electric motor (second motor/generator MG2), from overheating while traveling in the "series HEV mode."

(2) The mode transition controller (transmission control unit 23) sets the switchover vehicle speed to a vehicle speed value that decreases as the road surface gradient becomes more gradual, when changing the switchover vehicle speed from the first switchover vehicle speed VSP1 to the second switchover vehicle speed VSP2 (FIG. 8). Thus, in addition to the effect of (1), the traveling region, in which it is possible prevent the second power generation system, including the second motor/generator MG2, from overheating, can be expanded as the road surface gradient becomes more gradual.

(3) The mode transition controller (transmission control unit 23) comprises a mode transition map (shift schedule map of FIG. 7), in which a required driving force (Driving Force) and the vehicle speed (VSP) are the coordinate axes, and increases the required driving force when a temperature rise in the second electric motor (second motor/generator MG2) is determined while traveling in the "series HEV mode" (FIG. 6, S130). Thus, in addition to the effect of (1) or (2), it is possible to reliably prevent the second power generation system from overheating by promoting a mode transition to the "parallel HEV mode" by a system operation, when low vehicle speed travel is continued for a long period of time.

(4) When increasing the required driving force (Driving Force) (FIG. 6, S130), the mode transition controller (transmission control unit 23) reduces the amount of increase as the road surface gradient becomes more gradual (FIG. 9). Thus, in addition to the effect of (3), discomfort that is imparted to the driver can be reduced by reducing the amount of increase (MG1 acceleration amount) as the road surface gradient becomes more gradual, when increasing the required driving force.

(5) The mode transition controller (transmission control unit 23) sets, as temperature threshold values for determining a second power generation system temperature (estimated MG2 temperature), a first temperature threshold value T1, and a second temperature threshold value T2 that is higher than the first temperature threshold value T1, and while the second power generation system temperature (estimated MG2 temperature) is less than the first temperature threshold value T1, series power generation by the second electric motor (second motor/generator MG2) is carried out at a normal output, while the second power generation system temperature (estimated MG2 temperature) is equal to or greater than the first temperature threshold value T1 and less than a second temperature threshold value T2, series power generation by the second electric motor (second motor/generator MG2) is carried out at an output that is lower than the normal output, and when the second power generation system temperature (estimated MG2 temperature) becomes equal to or greater than the second temperature threshold value T2, series power generation by the second electric motor (second motor/generator MG2) is stopped (FIG. 6, S121-S131). Thus, in addition to the effects of (1) to (4), it is possible to prevent the second power generation system from overheating, and to contribute to an improvement in fuel consumption performance by securing the MG2 power generation amount, when traveling at a low vehicle speed is continued.

The mode transition control device for a hybrid vehicle of the present invention was described above based on a first embodiment, but specific configurations thereof are not limited to the first embodiment, and various modifications and additions to the design can be made without departing from the scope of the invention according to each claim in the Claims.

In the first embodiment, an example was shown in which it is predicted and determined whether or not a mode transition to the "parallel HEV mode" is possible at the first switchover vehicle speed VSP1, by monitoring changes in the vehicle speed VSP, in Step S11 of FIG. 5. However, Step S11 of FIG. 5 may be configured such that "engine rotation speed Ne" is used instead of "vehicle speed VSP," changes in the engine rotation speed Ne are monitored, and it is predicted and determined whether or not a mode transition to the "parallel HEV mode" is possible when the engine rotation speed Ne1 is at an engine rotation speed threshold value corresponding to the first switchover vehicle speed VSP1 (for example, 1000 rpm).

In the first embodiment, an example of a mode transition controller was shown in which a rise in the temperature of the second power generation system, including the second electric motor, while traveling in the "series HEV mode," is predicted from whether or not a mode transition at the first switchover vehicle speed VSP1 is possible using a continuous power generation permitted time. However, the mode transition controller may be configured to predict a rise in the temperature of the second power generation system, including the second electric motor, by monitoring the change state of a detected or estimated second electric motor temperature on the time axis, while traveling in the "series HEV mode."

In the first embodiment, an example was shown in which an estimated MG2 temperature obtained by calculation is used as information on the second power generation system temperature. However, detected temperature of the second power generation system, such as the MG2 temperature, second inverter temperature, junction box temperature, high-power battery temperature, and the like, detected by a sensor, may be used as the information on the second power generation system temperature.

In the first embodiment, an example was shown in which the mode transition control device of the present invention is applied to a hybrid vehicle, comprising, as drive system components, one engine, two motor/generators, and a multistage gear transmission having three engagement clutches. However, the mode transition control device of the present invention can be applied to a hybrid vehicle that can select between a "series HEV mode" and a "parallel HEV mode" regardless of the presence/absence of a transmission.

The invention claimed is:

1. A mode transition control device for a hybrid vehicle having an internal combustion engine configured to be mechanically coupled to a drive wheel via a first engagement clutch that is engaged by a first engagement stroke from a released position, a first electric motor configured to be mechanically coupled to the drive wheel via a third engagement clutch that is engaged by a third engagement stroke from a released position, a second electric motor that is mechanically coupled to the internal combustion engine, and a battery that is electrically coupled to the first electric motor and the second electric motor, and at the time of start, when a charge capacity of the battery is equal to or less than a predetermined value, the third engagement clutch is switched from a released state to an engaged state in a starting region by not having a slipping element as a starting element and the hybrid vehicle is started in a series HEV mode, in which the first electric motor is utilized as a drive source and receives electrical power generated by the second electric motor and the battery, and the mode transition control device comprising:

a mode transition controller configured to carry out a control such that when a vehicle speed becomes a switchover vehicle speed while traveling in the series HEV mode, the first engagement clutch is switched from a released state to an engaged state, power generation by the second electric motor is stopped, and a traveling mode is caused to transition to a parallel HEV mode, in which the first electric motor and the internal combustion engine are used as the drive sources, and when a temperature rise of a second power generation system including the second electric motor is predicted after starting in the series HEV mode, the mode transition controller changes the switchover vehicle speed to a second switchover vehicle speed which is slower than a first switchover vehicle speed used prior to a determination of the temperature rise, and the second switchover vehicle speed is set to a vehicle speed value that corresponds to an internal combustion engine rotational speed at which the internal combustion engine is capable of self-sustaining operation.

2. The mode transition control device as recited in claim 1, wherein the mode transition controller sets the switchover vehicle speed to a vehicle speed value that decreases as a road surface gradient becomes more gradual, when changing the switchover vehicle speed from the first switchover vehicle speed to the second switchover vehicle speed.

3. The mode transition control device as recited in claim 1, wherein the mode transition controller comprises a mode transition map, in which a required driving force and the vehicle speed are coordinate axes, and increases a required driving force when a temperature rise in the second electric motor is determined while traveling in the series HEV mode.

4. The mode transition control device as recited in claim 3, wherein when increasing the required driving force, the mode transition controller reduces an amount of increase as a road surface gradient becomes more gradual.

5. The mode transition control device as recited in claim 1, wherein the mode transition controller sets a first temperature threshold value, and a second temperature threshold value that is higher than the first temperature threshold value as temperature threshold values for determining the second power generation system temperature, and while the second power generation system temperature is less than the first temperature threshold value, series power generation by the second electric motor is carried out at a normal output; while the second power generation system temperature is equal to or greater than the first temperature threshold value and less than a second temperature threshold value, series power generation by the second electric motor is carried out at an output that is lower than the normal output; and when the second power generation system temperature becomes equal to or greater than the second temperature threshold value, series power generation by the second electric motor is stopped.

6. The mode transition control device as recited in claim 2, wherein the mode transition controller comprises a mode transition map, in which a required driving force and the vehicle speed are coordinate axes, and increases a required driving force when the temperature rise in the second electric motor is determined while traveling in the series HEV mode.

7. The mode transition control device as recited in claim 6, wherein when increasing the required driving force, the mode transition controller reduces an amount of increase as the road surface gradient becomes more gradual.

8. The mode transition control device as recited in claim 2, wherein the mode transition controller sets a first temperature threshold value, and a second temperature threshold value that is higher than the first temperature threshold value as temperature threshold values for determining the second power generation system temperature, and while the second power generation system temperature is less than the first temperature threshold value, series power generation by the second electric motor is carried out at a normal output; while the second power generation system temperature is equal to or greater than the first temperature threshold value and less than a second temperature threshold value, series power generation by the second electric motor is carried out at an output that is lower than the normal output; and when the second power generation system temperature becomes equal to or greater than the second temperature threshold value, series power generation by the second electric motor is stopped.

9. The mode transition control device as recited in claim 3, wherein the mode transition controller sets a first temperature threshold value, and a second temperature threshold value that is higher than the first temperature threshold value as temperature threshold values for determining the second power generation system temperature, and while the second power generation system temperature is less than the first temperature threshold value, series power generation by the second electric motor is carried out at a normal output; while the second power generation system temperature is equal to or greater than the first temperature threshold value and less than a second temperature threshold value, series power generation by the second electric motor is carried out at an output that is lower than the normal output; and when the second power generation system temperature becomes equal to or greater than the second temperature threshold value, series power generation by the second electric motor is stopped.

10. The mode transition control device as recited in claim 4, wherein the mode transition controller sets a first temperature threshold value, and a second temperature threshold value that is higher than the first temperature threshold value as temperature threshold values for determining the second power generation system temperature, and while the second power generation system temperature is less than the first temperature threshold value, series power generation by the second electric motor is carried out at a normal output; while the second power generation system temperature is equal to or greater than the first temperature threshold value and less than a second temperature threshold value, series power generation by the second electric motor is carried out at an output that is lower than the normal output; and when the second power generation system temperature becomes equal to or greater than the second temperature threshold value, series power generation by the second electric motor is stopped.

* * * * *